US012465877B1

(12) United States Patent
    Hale

(10) Patent No.: US 12,465,877 B1
(45) Date of Patent: Nov. 11, 2025

(54) CONTINUOUS TRICHOME SEPARATION

(71) Applicant: Amalgam Corp, Golden, CO (US)

(72) Inventor: Mitchel Hale, Lakewood, CO (US)

(73) Assignee: Amalgam Corp, Aurora, CO (US)

( * ) Notice: Subject to any disclaimer, the term of this patent is extended or adjusted under 35 U.S.C. 154(b) by 807 days.

(21) Appl. No.: 17/851,441

(22) Filed: Jun. 28, 2022

Related U.S. Application Data

(60) Provisional application No. 63/216,053, filed on Jun. 29, 2021.

(51) Int. Cl.
    *B01D 21/26* (2006.01)
    *B01D 21/24* (2006.01)
    *B01D 29/01* (2006.01)
    *B01D 29/88* (2006.01)
    *B01D 29/90* (2006.01)
    *B01D 29/94* (2006.01)
    *B04C 3/00* (2006.01)
    *B04C 9/00* (2006.01)

(52) U.S. Cl.
    CPC ....... *B01D 21/265* (2013.01); *B01D 21/2472* (2013.01); *B01D 29/01* (2013.01); *B01D 29/88* (2013.01); *B01D 29/906* (2013.01); *B01D 29/908* (2013.01); *B01D 29/94* (2013.01); *B04C 3/00* (2013.01); *B04C 2009/004* (2013.01)

(58) Field of Classification Search
    CPC .. B01D 21/265; B01D 21/2472; B01D 29/01; B01D 29/88; B01D 29/906; B01D 29/908; B01D 29/94; B04C 3/00; B04C 2009/004
    See application file for complete search history.

(56) References Cited

U.S. PATENT DOCUMENTS

| 3,586,294 A | * | 6/1971 | Strong | B08B 9/0933 976/DIG. 383 |
| 4,130,478 A | * | 12/1978 | Swallow | B01D 29/908 209/389 |
| 2022/0250094 A1 | * | 8/2022 | Van Der Upwich | B04C 3/06 |

FOREIGN PATENT DOCUMENTS

| CN | 107303444 A | * | 10/2017 | ......... B01D 29/6438 |
| GB | 2081116 A | * | 2/1982 | ............ B01F 21/504 |

* cited by examiner

*Primary Examiner* — Liam Royce
(74) *Attorney, Agent, or Firm* — Stanley J. Gradisar Attorney At Law, LLC; Stanley J. Gradisar

(57) ABSTRACT

Disclosed is an apparatus and method used to isolate organic acid forms of cannabinoids from a source biomass. This includes the use of a continuous, flow driven, biomass agitation unit, referred to herein as the Continuous Trichome Separator (CTS) Unit. Biomass is fed into the CTS Unit, where trichomes are shaken off of the biomass, and a mixture of trichomes and fluid continue for further processing. The trichomes are melted and then separated using chromatographic separation techniques. Thereafter the organic acids are dehydrated and become isolate compounds.

4 Claims, 4 Drawing Sheets

CONTINUOUS TRICHOME SEPARATION

CROSS REFERENCE TO RELATED APPLICATION

This application claims the benefit of U.S. Provisional Application Ser. No. 63/216,053 filed on Jun. 29, 2021 and titled "VORTEX TRICHOME SEPARATION/CONTINUOUS DEFLECTIVE SCREENING (VTS/CDS) SYSTEM AND PROCESS" which is incorporated herein by reference in its entirety for all that is taught and disclosed therein.

FIELD OF THE INVENTION

The present invention relates to an apparatus and method for isolating or purifying plant trichomes, resin ducts, oil glands and/or other plant organic compounds through a continuous flow driven vortex and centrifugal agitation.

BACKGROUND OF THE INVENTION

Trichomes are a part of the cannabis plant that produces and stores THCa, CBDa, and other cannabinoids. Trichomes are an isolated structure on the surface of the cannabis plant consisting of the organic acid form of cannabinoids. The separation of trichomes is an important process in the commercial production of many cannabinoids.

Current industrial production of cannabinoid isolates, oils, and concentrates rely on high energy or high-cost methodologies, such as supercritical $CO_2$ or ethanol as solvent extraction methods.

Regarding Supercritical $CO_2$, when $CO_2$ exceeds temperatures of 87.9° F. (31.1° C.) and is subjected to pressures above 1071 psi (7.39 MPa) it becomes supercritical and obtains a dielectric constant that solvates cannabinoids. A supercritical fluid has the properties of both liquid and gas. The supercritical $CO_2$ is run through biomass which dissolves the cannabinoids, and then, in a second vessel, the pressure is lowered so that $CO_2$ and cannabinoids separate.

Regarding ethanol as a solvent extraction method, ethanol naturally solvates cannabinoids. It has been used as a solvent in short path distillation systems and cold soaking systems. Short path distillation is when ethanol and biomass are mixed within a chamber arranged between a simple distillation column and a heater. As the ethanol is heated to around 80° C. the cannabinoids are removed from the biomass and lifted into the distillation column. In cold soaking extraction cold ethanol at around −40° C. is pumped through biomass, then filtered, and separated using various methods.

A variety of small scale trichome separation methodologies are used in the recreational cannabis space. These processes focus on making a smokable hash product. However, these processes do not feed into the later stage production of concentrated products. These processes are also all fully batch. Fully batch means that all components in a system operate as a batch, i.e., there is no flow of material into or out of the system during agitation. Water, ice, and biomass are simply mixed in a vessel and then treated afterwards.

SUMMARY OF THE INVENTION

The present disclosure describes embodiments of an apparatus and method for the separation of trichomes from biomass that is continuous, flow driven, and scalable. These qualities enable the use of trichomes as a feedstock for industrial hemp processing and rare cannabinoid production. Rare cannabinoids are any cannabinoid that is found in very low quantities across strains of the cannabis plant, including but not limited to CBG, CBGa, and CBDV.

An embodiment of a method described herein consists of several manufacturing and chemical processing units, where a unit can be defined as any machine with a role to play in the process. These units include, but are not limited to, one or more each of storage tanks, pumps, heat exchangers, conveyors, valves, Continuous Trichome Separation ("CTS") Units, voraxial separator units, back flow protectors, centrifugal chromatography units, and vacuum dehydrators.

In one embodiment, the method of producing the organic acid form of various cannabinoids consists of three primary units: the novel CTS Unit, a voraxial separation unit, and a chromatographic separation unit. This method focuses on the early-stage removal of trichomes from the biomass to reduce the amount of downstream processing time and energy, a significant improvement over the current state of the art.

Trichome separation via the CTS Unit can be achieved by using a flow driven agitation. This agitation method takes the form of a vortex chamber with actuator managed nozzles. The heavier particles will hit the wall and fall to the bottom of the vortex chamber and are then pumped out through the funnel outlet at the bottom of the vortex chamber. Remaining waste biomass is removed from the system using a backwashing system.

The voraxial separator is a unit used for the separation of one stream containing parts nonpolar liquid, polar liquid, and solids into three streams containing a majority of any of the three components. Herein the voraxial separator is used to separate water (polar liquid), trichome oil (nonpolar liquid), and remnant biomass (solids).

The chromatographic separation unit is the primary method used to isolate organic acids from one another.

Figure 1:
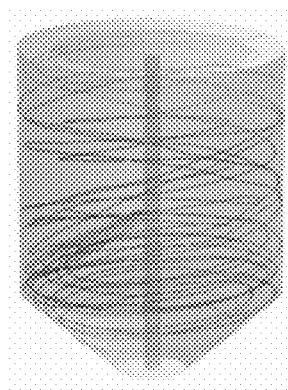
FIG. 1 shows a vortex particle path separation profile inside of the CTS Unit in which the lines represent the direction of particles swirling in a vortex, and the density or thickness of the lines represents the density of particles from lighter density (thinner lines) towards the top of the CTS Unit to heavier density (thicker lines) towards the bottom of the CTS Unit in an embodiment of the present invention.

To assist in the understanding of the present disclosure the following list of components and associated numbering found in the drawings is provided herein:

| Table of Components. | |
|---|---|
| Component | # |
| Flow Arrow Biomass Supply 1 | 1 |
| Biomass Dry Storage Tank | 2 |
| Flow Arrow Biomass | 3 |

-continued

Table of Components.

| Component | # |
|---|---|
| Conveyor | 4 |
| Flow Arrow Biomass | 5 |
| CTS Unit | 6 |
| Flow Arrow Trichome Process | 7 |
| Pump | 8 |
| Flow Arrow Trichome Process | 9 |
| Trichome Storage Tank | 10 |
| Flow Arrow Trichome Process | 11 |
| Heat Exchanger | 12 |
| Flow Arrow Liquid Trichome Process | 13 |
| Voraxial Separator Unit | 14 |
| Flow Arrow Water Recycle | 15 |
| Three Way Valve | 16 |
| Flow Arrow Water Recycle | 17 |
| Cooled Water Storage | 18 |
| Flow Arrow Source Water | 19 |
| Flow Arrow Water Recycle | 20 |
| Pump | 21 |
| Flow Arrow Water Agitation | 22 |
| Three Way Valve | 23 |
| Flow Arrow Water Agitation | 24 |
| Flow Arrow Flood Line | 25 |
| Flow Arrow Wet Biomass | 26 |
| Conveyer | 27 |
| Flow Arrow Wet Biomass | 28 |
| Flow Arrow Water Recycle | 29 |
| Flow Arrow Wet Biomass | 30 |
| Flow Arrow Liquid Trichome Process | 31 |
| Liquid Trichome Storage Tank | 32 |
| Flow Arrow Liquid Trichome Process | 33 |
| Backflow Protector | 34 |
| Flow Arrow Liquid Trichome Process | 35 |
| Pump | 36 |
| Flow Arrow Liquid Trichome Process | 37 |
| Centrifugal Chromatography Unit | 38 |
| Flow Arrow Source Water | 39 |
| Flow Arrow Non-CBD Liquid Extract | 40 |
| Flow Arrow CBD Liquid Extract | 41 |
| Vacuum Dehydrator Unit | 42 |
| Flow Arrow Water Waste | 43 |
| Flow Arrow CBD Isolate Product | 44 |
| Nozzle Pipe | 45 |
| Nozzle Pipe Orifice | 46 |
| Shaft Gear | 47 |
| Vessel Main Orifice | 48 |
| Vessel Cylinder | 49 |
| Nozzle Pipe Channel | 50 |
| Vessel Backwash Orifice | 51 |
| Backwash Pipe | 52 |
| Nozzles | 53 |
| Nozzle Pipe Anchor | 54 |
| Nozzle Pipe Channel Socket | 55 |
| Screen | 56 |
| Vessel Funnel | 57 |
| Vessel Funnel Orifice | 58 |
| Center Axis | 59 |
| Motor | 60 |

DETAILED DESCRIPTION

Referring now to the Figures, in which like reference numerals refer to structurally and/or functionally similar elements thereof, FIG. 1 shows a vortex particle path separation profile inside of the CTS Unit in which the lines represent the direction of particles swirling in a vortex, and the density or thickness of the lines represents the density of particles from lighter density (thinner lines) towards the top of the CTS Unit to heavier density (thicker lines) towards the bottom of the CTS Unit in an embodiment of the present invention. Traditional vortex trichrome separation technologies rely on the ability to switch flow directions to agitate hemp biomass material within a vessel. Referring now to FIG. 1, this principle can be achieved, in an embodiment of the present invention, by using a flow-driven vortex instead of a paddle-driven vortex. The flow-driven aspect is achieved using two columns of actuator-managed flow nozzles on either side of the interior walls of the tank (see FIG. 4). The heavier particles will fall along the outer wall to the bottom and center of the vortex chamber.

To ensure the continuous nature of the trichome outlet stream, Continuous Deflective Screening (CDS) is employed (see FIG. 4). To achieve sufficient trichome separation, in one embodiment of the invention, the feedstock to the CTS Unit is preferably kept at a maximum temperature of −20° C., and a recommended temperature of −80° C. with satisfactory results obtained within this range. In another embodiment, liquid nitrogen, which is at −200° C., may also be used to extend the temperature range to yield satisfactory results. As a result of the fluid velocity, it will be possible to keep the fluid under 0° C. without it freezing during the separation process. This is conventionally achieved using traditional refrigerants like R-22 or R-134a. In one embodiment, the present invention utilizes an environmentally friendly refrigerant which is a zeotropic mixture of R290/R600 with a composition of 68 wt % R290 to 32 wt % R600. It has been found that when compared to R-12, a refrigerant that behaves similarly to R134a (the typical alternative to R-22), the zeotropic mixture produces a coefficient of performance 10.7%-23.6% higher than R-12. The power required to pump the new mixture is higher by about 0.4% on average, but this is a good tradeoff considering the reduced environmental impact as well as the increased performance. The screen size for the CTS technology is optimized to enable operation at high flow rates. Screen mesh sizes between 5,000 microns to 10,000 microns may be utilized in some embodiments, and 10 microns to 5,000 microns may be utilized in other embodiments. The smaller the screen mesh, the more often the CTS Unit will need cleaning. The screen mesh size does not affect the flow rates.

The CTS Unit is preferably operated at −5° C. Insulation will be enough to keep the water at this temperature, so long as the water flow is, for the most part, continuous through the vessel. Cooling the ambient temperature and pressure water to −5° C. before it enters the CTS Unit will be the primary use of any refrigeration surrounding this unit.

Figure 2:
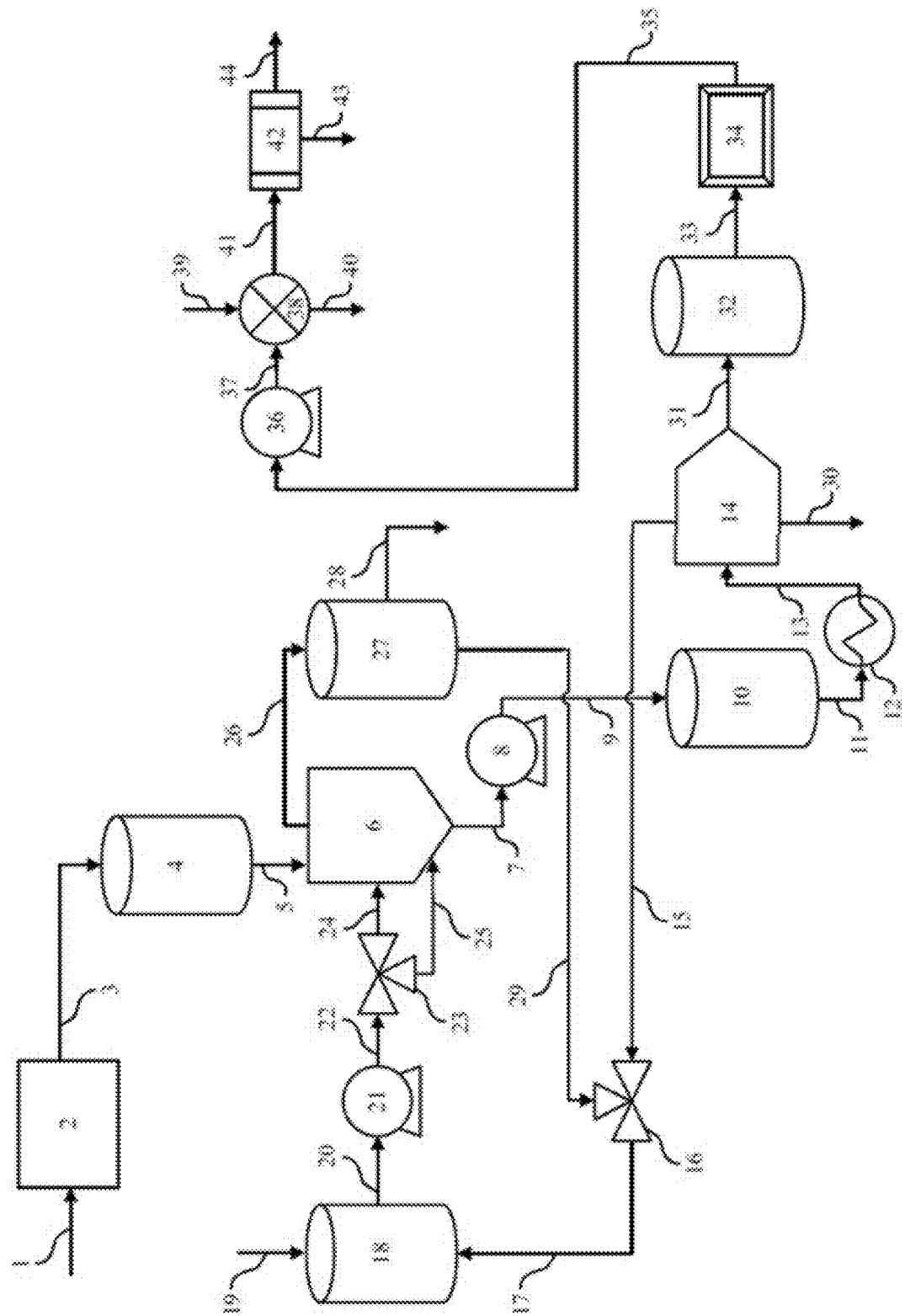
FIG. 2 shows a process flow diagram in an embodiment of the present invention.

FIG. 2 shows a process flow diagram in an embodiment of the present invention. Referring now to FIG. 2, Flow Arrow Biomass Supply 1 represents the filling of the Biomass Dry Storage Tank 2 which holds dry biomass before startup. Flow Arrow Biomass 3 represents the flow of dry biomass exiting Biomass Dry Storage Tank 2.

Conveyor 4 is the mechanism that physically transports the dry biomass from Biomass Dry Storage Tank 2 and Flow Arrow Biomass 3 via Flow Arrow Biomass 5 and into the CTS Unit 6 at a batch at a time. CTS Unit 6 is a continuous processing unit consisting of high-pressure fluid, typically water or any other inorganic fluid, agitating a mixture of wet biomass, trichomes, and water. CTS Unit 6 is preferably operated at −5° C. Insulation will be enough to keep the water at this temperature, so long as the water flow is, for the most part, continuous through CTS Unit 6. Cooling the water to −5° C. before it enters the CTS Unit 6 will be the primary use of any refrigeration surrounding CTS Unit 6. Table 1 is intended to portray the attainable flow velocities at a current valve configuration in one embodiment of the invention. If the velocity is too low to drive the vortex, then the overall volumetric flow rate could be increased, or the inlet diameter reduced. One skilled in the art will recognize that other flow rates and inlet velocity, above and/or below those shown, will differ upon different configurations of the overall system.

TABLE 1

Energy Related Requirements In One Embodiment For CTS Unit 6

| Parameter | Value |
| --- | --- |
| Water Flow Rate (L/min) | 17.8 |
| Inlet velocity (cm/s) | 2204 |

A large excess of water to trichomes is used in the CTS Unit 6. In one embodiment a 100:1 ratio of water to trichomes is used in the CTS Unit 6. One skilled in the art will recognize that other ratios will differ upon different configurations of the overall system. The CTS Unit 6 can "shake" off and separate about 75% of the trichome mass of the dry biomass. CTS Unit 6 includes a screening apparatus, Screen 56, that suspends the biomass within the CTS Unit 6 to prevent the bulk of the biomass from passing through the system. Table 2 summarizes a sizing of the CTS Unit 6 in one embodiment of the invention. One skilled in the art will recognize that other values, above and/or below those shown for a particular parameter, will differ upon different configurations of the overall system.

TABLE 2

Sizing Parameters For CTS Unit 6 In One Embodiment

| Parameter | Value |
| --- | --- |
| Vessel volume (L)$^8$ | 198 |
| Total Vessel Height (m)$^8$ | 0.81 |
| Cylinder (cm) | 56 |
| Cone (cm) | 25 |
| Main diameter (m)$^8$ | 0.62 |
| Bottom Diameter (m)$^8$ | 0.076 |
| Water Flow Rate$^8$ (L/min) | 0.198 |
| Screen Mesh (mm)$^8$ | 1 |

A backwashing system floods the vessel from the bottom after each batch. During backwash, Three Way Valve 23 regulates the switching between Flow Arrow Flood Line 25 and Flow Arrow Water Agitation 24. To begin the backwashing process, Three Way Valve 23 redirects flow into Vessel Funnel Orifice 58 via Flow Arrow Flood Line 25. The water level within CTS Unit 6 then rises until it is at or above Vessel Backwash Orifice 51. During this process water and trichomes can move freely across Screen 56 in either direction, but the bulk of the remaining biomass does not pass through Screen 56. Due to its buoyancy, biomass floats to the top of the rising water level within the CTS Unit 6. The floating biomass then flows through Vessel Backwash Orifice 51 and then Backwash Pipe 52. Flow Arrow Wet Biomass 26 represents the flow of water, waste biomass, and some small amount of trichomes moving through Backwash Pipe 52 and on to Conveyor 27 and then disposed.

Flow Arrow Trichome Process 7 shows the flow of trichomes and water exiting the CTS Unit 6 and continuing down the main process line via Pump 8, which is responsible for drawing the trichomes and water from the CTS Unit 6 and controlling the water level in the CTS Unit 6.

Flow Arrow Trichome Process 9 represents the flow of trichomes and water exiting Pump 8 and into Trichome Storage Tank 10. Trichome Storage Tank 10 is a tank in which a mixture of trichomes, water, and a small amount of wet biomass is stored.

Flow Arrow Trichome Process 11 shows the flow of the mixture exiting Trichome Storage Tank 10 and entering Heat Exchanger 12. Heat Exchanger 12 is used to transform the mixture of trichomes, water, and a small amount of solid wet biomass into a miscible mixture of liquid components, and a small amount of solid wet biomass.

Flow Arrow Liquid Trichome Process 13 represents the flow of the miscible mixture of the liquid components, and the small amount of solid wet biomass leaving Heat Exchanger 12 and entering the Voraxial Separator Unit 14. Voraxial Separator Unit 14 is designed to split the liquid components, and some small fraction solid wet biomass into three streams of: water; wet solids; and liquid trichomes which is like an oil at this stage. The operating temperature range for the Voraxial Separator Unit 14 is above the melting point of trichomes, but below the decarboxylation point of common cannabinoids. The Voraxial Separator Unit 14 operates at atmospheric pressure (83.5 kPa).

Flow Arrow Water Recycle 15 represents the reclaimed, now warm, excess water exiting the Voraxial Separator Unit 14 and entering Three Way Valve 16. Three Way Valve 16 controls the flow of reclaimed, now warm, water merging with Flow Arrow Water Recycle 29 to form Flow Arrow Water Recycle 17. Flow Arrow Water Recycle 17 represents the flow of water exiting Three Way Valve 16 and entering Cooled Water Storage 18. Cooled Water Storage 18 is a tank in which water is cooled. This water will typically contain some lesser part trichomes and wet biomass.

Flow Arrow Source Water 19 represents the flow of source water entering Cooled Water Storage 18. Cooled Water Storage 18 is initially filled before startup and then controls the system water level during operation.

Flow Arrow Water Recycle 20 represents the flow of water leaving Cooled Water Storage 18 and entering Pump 21. Pump 21 is used to accelerate the flow of water, changing it into Flow Arrow Water Agitation 22. Flow Arrow Water Agitation 22 represents the accelerated flow of water exiting Pump 21 and entering Three Way Valve 23. Three Way Valve 23 controls the flow of Water Agitation 22, Flow Arrow Water Agitation 24, and Flow Arrow Flood Line 25.

Flow Arrow Water Agitation 24 represents the accelerated flow of water exiting Three Way Valve 23 and entering the CTS Unit 6, with the purpose of acting as a mechanism for biomass agitation.

Flow Arrow Flood Line 25 represents the pulse flow of water exiting Three Way Valve 23 and entering the CTS Unit 6 with the purpose of flooding the CTS Unit 6 and removing wet biomass. Flow Arrow Wet Biomass 26 represents the pulse flow of biomass and water exiting the CTS Unit 6 and entering Conveyor 27. Conveyer 27 is a mechanism with a screen with the purpose of reclaiming some of the water contained in Flow Arrow Wet Biomass 26. Flow Arrow Wet Biomass 28 represents the waste flow of wet, used biomass exiting Conveyor 27.

Flow Arrow Water Recycle 29 represents the flow of reclaimed water exiting Conveyor 27 and entering Three Way Valve 16. Flow Arrow Water Recycle 15, Flow Arrow Water Recycle 17, Flow Arrow Water Recycle 20, and Flow Arrow Water Recycle 29 are collectively referred to as a Fluid Recycle Loop.

Flow Arrow Wet Biomass 30 represents the waste flow of used biomass wet solids expelled from the Voraxial Separator Unit 14.

Flow Arrow Liquid Trichome Process 31 represents the flow of liquid trichomes and a small amount of water exiting the Voraxial Separator Unit 14 and entering Liquid Trichome Storage Tank 32. Liquid Trichome Storage Tank 32 is a tank used to store a mixture of liquid trichomes and a small amount of water.

Flow Arrow Liquid Trichome Process 33 represents the flow of liquid trichomes and a small amount of water leaving Liquid Trichome Storage Tank 32 and into the Backflow Protector 34. Backflow Protector 34 is a device used to ensure that Liquid Trichome Process 35 cannot return to Liquid Trichome Storage Tank 32.

Flow Arrow Liquid Trichome Process 35 represents the flow of liquid trichomes and a small amount of water exiting the Backflow Protector 34 and into Pump 36. Pump 36 is responsible for regulating the pressure of Flow Arrow Liquid Trichome Process 37. Flow Arrow Liquid Trichome Process 37 represents the flow of liquid trichomes and some lesser part water exiting Pump 36 and entering the Centrifugal Chromatography Unit 38. Centrifugal Chromatography Unit 38 is a liquid chromatography unit that creates a separation gradient based on compound density using centrifugal force. One skilled in the art will recognize that other types of centrifugal separation technology may be used instead of Centrifugal Chromatography Unit 38.

Flow Arrow Source Water 39 represents the flow of source water entering the Centrifugal Chromatography Unit 38, with the purpose of regulating a desired solvent:solute ratio. In one embodiment, a 10:1 mass ratio of solvent ($H_2O$) to full spectrum oil is used within the Centrifugal Chromatography Unit 38. One skilled in the art will recognize that other ratios could be used based on different configurations of the overall system.

Flow Arrow Non-CBD Liquid Extract 40 represents the flow of water and non-CBDa organic extracts exiting Centrifugal Chromatography Unit 38.

Flow Arrow CBD Liquid Extract 41 represents the flow of the target CBDa extract and a small amount of water exiting the Centrifugal Chromatography Unit 38 and into the Vacuum Dehydrator Unit 42. Vacuum Dehydrator Unit 42 is the unit responsible for removing the water from Flow Arrow CBD Liquid Extract 41.

Flow Arrow Water Waste 43 represents the flow of wastewater removed from Flow Arrow CBD Liquid Extract 41 exiting Vacuum Dehydrator Unit 42.

Flow Arrow CBD Isolate Product 44 represents the flow of the final target CBDa isolate product which is then subject to further processing.

Figure 4B:
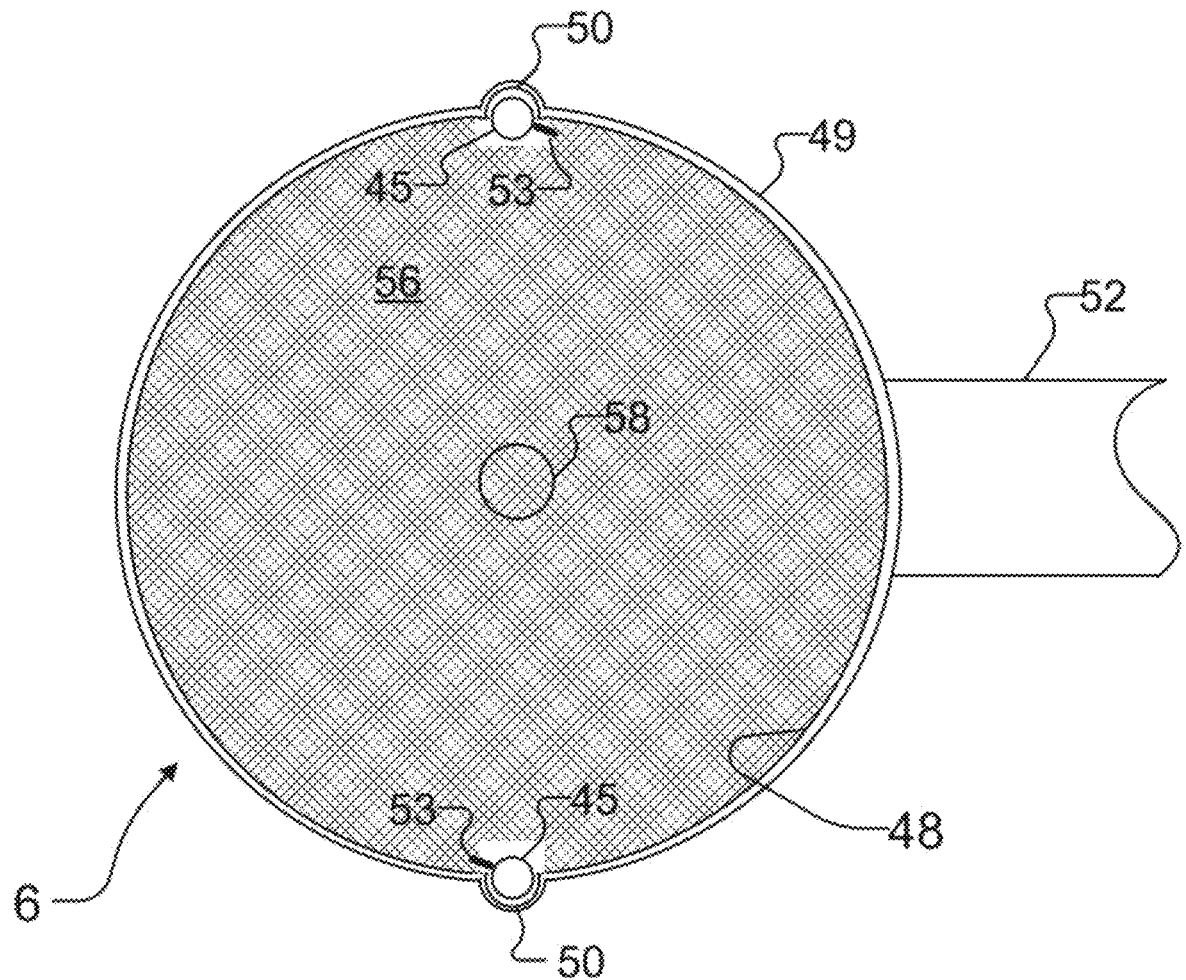
FIG. 4B shows a cross section plan view of the CTS Unit in an embodiment of the present invention.
Figure 4A:
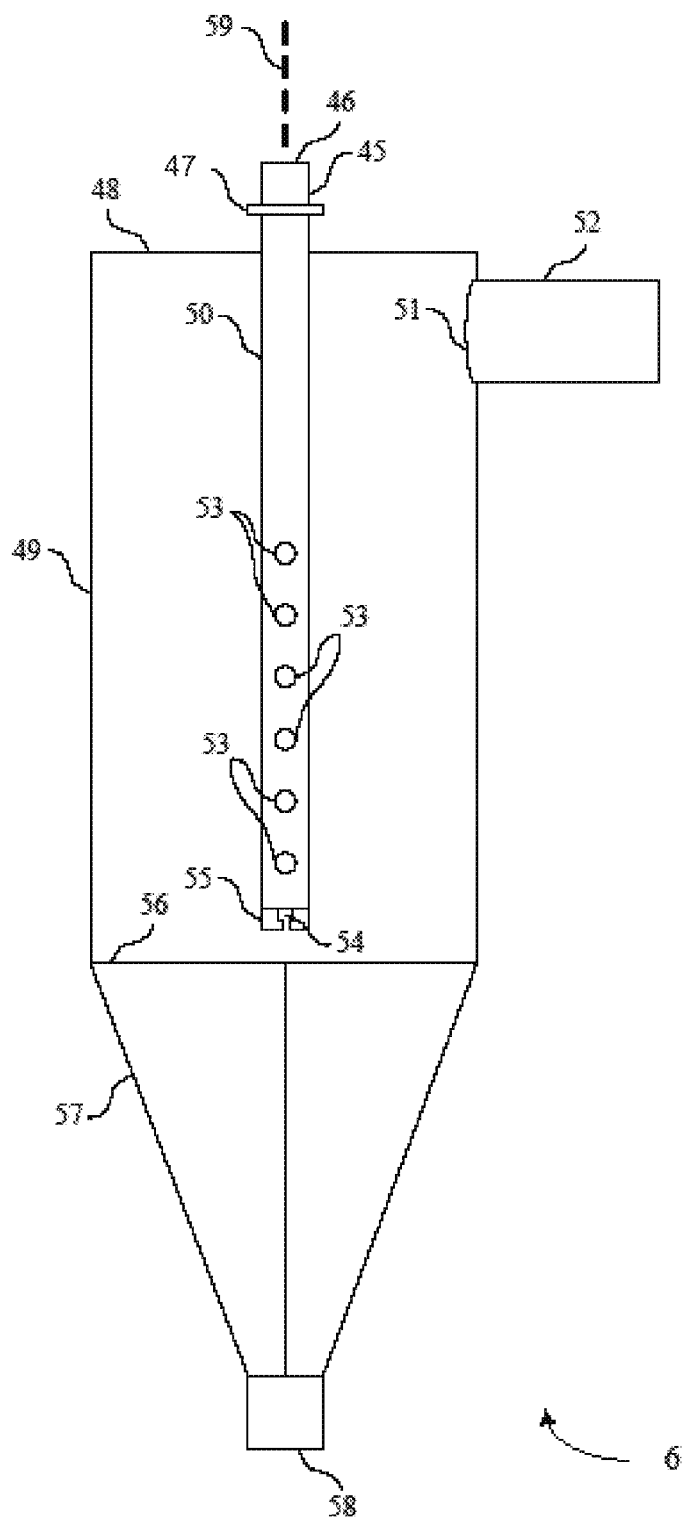
FIG. 4A shows a cross section side view of the CTS Unit in an embodiment of the present invention.

4A shows a cross section side view of the CTS Unit in an embodiment of the present invention, and FIG. 4B shows a cross section plan view of the CTS Unit in an embodiment of the present invention. Referring now to FIGS. 4A and 4B, CTS Unit 6 has a Vessel Cylinder 49 fixed atop a vessel funnel 57. Biomass is added to CTS Unit 6 via Main Vessel Orifice 48. Water is added to the system via Nozzle Pipe Orifice 46, where it is forced out through a plurality of Nozzles 53 that are aligned with each other vertically on a lower portion of Nozzle Pipes 45. Nozzle Pipes 45 rest within Nozzle Pipe Channels 50 embedded in the perimeter wall of Vessel Cylinder 49. Nozzle Pipes 45 are secured at a lower end to Vessel Cylinder 49 via the junction between Nozzle Pipe Anchors 54 and Nozzle Pipe Channel Sockets 55 embedded in the perimeter wall of Vessel Cylinder 49. One, two, or more Nozzle Pipes 45 can be embedded in one, two, or more Nozzle Pipe Channels 50 spaced around the perimeter of Vessel Cylinder 49. The water level within Vessel Cylinder 49 is at least above the topmost Nozzles 53.

During agitation, a Motor 60 drives Shaft Gears 47 located on the upper portion of Nozzle Pipes 45 causing Nozzle Pipes 45 to rotate around their Center Axes 59. Shaft Gears 47 also serve to keep upper portion of Nozzle Pipes 45 aligned vertically within Nozzle Pipe Channels 50. As part of this agitation, trichomes run into the inner wall of Vessel Cylinder 49 and fall downward via gravity towards Screen 56 located horizontally below Vessel Cylinder 49 and above vessel funnel 57.

Both Nozzle Pipes 45 rotate clockwise or counterclockwise via Motor 60 and Shaft Gear 47 in unison so that Nozzles 53 point the same way in either orientation, meaning that Nozzles 53 don't point towards each other. Nozzles 53 point so that the flow of water is circular, creating the vortex. Nozzle Pipes 45 rotate at predetermined set times to change the flow of water from clockwise to counterclockwise and vice versa. This flow direction change causes the turbulence that shakes the trichomes off the biomass. The rotation of Nozzle Pipes 45 is limited so that Nozzles 53 do not come into contact with the interior wall of Vessel Cylinder 49. The Nozzles 53 are full cone nozzles.

During backwash, the water ceases to flow out through Nozzles 53 and is instead pumped in via Vessel Funnel Orifice 58. The water level rises with biomass floating at the top, which exits the vessel via vessel Backwash Orifice 51 and thereafter through Backwash Pipe 52.

Figure 3:
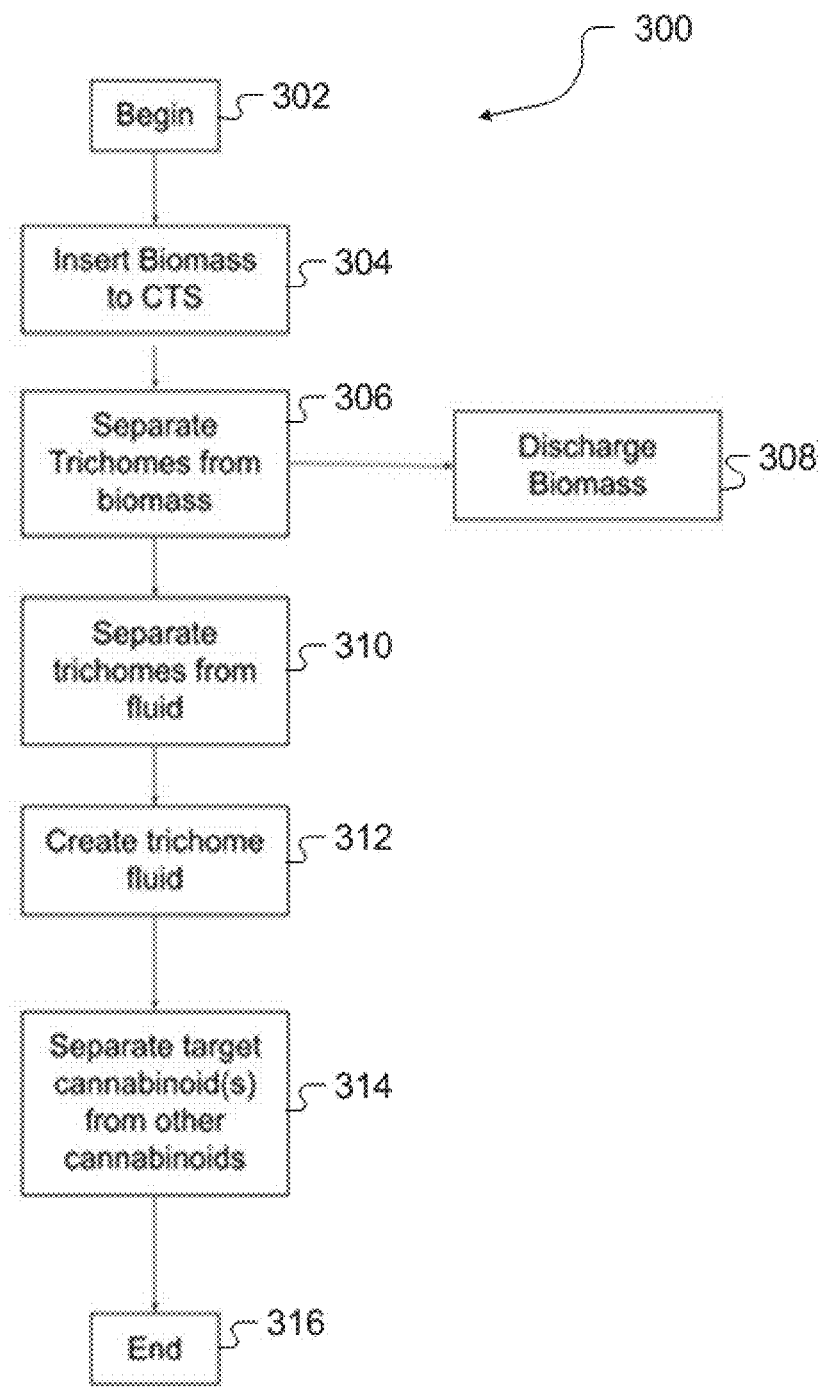
FIG. 3 shows a technical representation flow chart of the CTS Unit in an embodiment of the present invention.

FIG. 3 shows a technical representation flow chart of the CTS Unit in an embodiment of the present invention. Referring now to FIG. 3, CTS Process 300 begins in block 302. In block 304 biomass is conveyed into CTS Unit 6. In block 306 trichomes are separated from the biomass via a continuous flow driven vortex and centrifugal agitation within the CTS Unit 6. In block 308 the remaining biomass is discharged during a backwash operation that is performed periodically, stopping the continuous trichome separation process temporarily. In block 310 trichomes are separated from other fluids via a Voraxial Separator Unit 14 that splits the liquid components, and some small fraction solid of wet biomass into three streams of: water; solids; and oil (liquid trichomes). In block 312 a stream of trichrome fluid that is a CBDa extract, and some amount of water is isolated. In block 314 the target cannabinoid(s) are separated from non-target cannabinoid(s). In block 316 the process ends.

The operating temperature range for the CTS Unit 6 is preferably lower than 10° C. The CTS Unit 6 will function at any temperature in which trichomes are a solid, which in most situations would be at any temperature below 60° C. However, it is anticipated that temperatures above 10° C. would not be able to compete with the effectiveness achieved at lower temperatures. CTS Unit 6 performance increases as temperature is lowered, so long as water can remain in the fluid state.

Having described the present invention, it will be understood by those skilled in the art that many changes in construction and circuitry and widely differing embodiments and applications of the invention will suggest themselves without departing from the scope of the present invention.

What is claimed is:

1. An apparatus for continuously separating a trichomes from a biomass comprising:
    a vessel funnel;
    a vessel cylinder fixed atop the vessel funnel;
    a nozzle pipe that rotatably rests within a nozzle pipe channel in a perimeter wall of the vessel cylinder;
    a nozzle pipe anchor in junction with a nozzle pipe channel socket for securing a lower end of the nozzle pipe to the vessel cylinder; and a plurality of nozzles aligned with each other vertically on a lower portion of the nozzle pipe.

2. The apparatus according to claim 1 further comprising:
a shaft gear located on an upper portion of the nozzle pipe; and
a motor that rotates the shaft gear.

3. The apparatus according to claim 1 further comprising:
a screen located horizontally below the vessel cylinder and above the vessel funnel.

4. The apparatus according to claim 1 further comprising:
a nozzle pipe orifice located at the top of the nozzle pipe;
a vessel main orifice located at the top of the vessel cylinder;
a vessel funnel orifice located at the bottom of the vessel funnel;
a vessel backwash orifice located on a top side of the vessel cylinder; and
a backwash pipe extending laterally from the vessel backwash orifice.

* * * * *